United States Patent
Nandjou Dongmeza et al.

(10) Patent No.: US 10,686,202 B2
(45) Date of Patent: *Jun. 16, 2020

(54) DETERMINATION OF A SPATIAL DISTRIBUTION OF AN ELECTRICAL PRODUCTION PARAMETER OF AN ELECTROCHEMICAL CELL

(71) Applicant: Commissariat A L'Energie Atomique et aux Energies Alternatives, Paris (FR)

(72) Inventors: Fredy-Intelligent Nandjou Dongmeza, Grenoble (FR); Jean-Philippe Poirot-Crouvezier, Saint Georges de Commiers (FR); Fabrice Micoud, La Buisse (FR); Mathias Gerard, Grenoble (FR); Christophe Robin, Grenoble (FR); Lara Jabbour, Turin (IT); Remi Vincent, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 366 days.

This patent is subject to a terminal disclaimer.

(21) Appl. No.: 15/271,669

(22) Filed: Sep. 21, 2016

(65) Prior Publication Data

US 2017/0098837 A1    Apr. 6, 2017

(30) Foreign Application Priority Data

Sep. 21, 2015    (FR) ..................................... 15 58895

(51) Int. Cl.
   *H01M 8/0297*    (2016.01)
   *H01M 8/0247*    (2016.01)
   (Continued)

(52) U.S. Cl.
   CPC .......... *H01M 8/0297* (2013.01); *C25B 9/063* (2013.01); *C25B 15/02* (2013.01); *H01M 8/0202* (2013.01);
   (Continued)

(58) Field of Classification Search
   CPC ............. H01M 8/0297; H01M 8/0202; H01M 8/04701; H01M 8/0267; H01M 8/0265;
   (Continued)

(56) References Cited

U.S. PATENT DOCUMENTS 4,567,117 A    1/1986 Patel et al.
2004/0247991 A1    12/2004 Suzuki et al.
(Continued)

FOREIGN PATENT DOCUMENTS

EP    2 924 793 A1    9/2015
FR    2 976 732 A1    12/2012
(Continued)

OTHER PUBLICATIONS

Machine translation of JP 2000-090950, Sugami et al., Mar. 31, 2000 (Year: 2000).*
(Continued)

*Primary Examiner* — Maria Laios
*Assistant Examiner* — Kwang Han
(74) *Attorney, Agent, or Firm* — Oblon, McClelland, Maier & Neustadt, L.L.P.

(57) ABSTRACT

A method is provided for determining a spatial distribution $(R_{x,y}{}^f)$ of a parameter of interest (R) representative of the electrical power production of an electrochemical cell, including steps of determining the spatial distribution $(R_{x,y}{}^f)$ the parameter of interest (R) depending on a spatial distribution $(Q_{x,y}{}^e)$ of a second thermal quantity $(Q^e)$ estimated (Continued)

beforehand from a spatial distribution ($T_{x,y}^c$) of a set-point temperature ($T^c$) and from a spatial distribution ($D_{x,y}^r$) of a first thermal quantity ($D^r$).

12 Claims, 6 Drawing Sheets

(51) Int. Cl.
| | | |
|---|---|---|
| H01M 8/04701 | (2016.01) | |
| H01M 8/0267 | (2016.01) | |
| H01M 8/0432 | (2016.01) | |
| H01M 8/04537 | (2016.01) | |
| H01M 8/04298 | (2016.01) | |
| H01M 8/0265 | (2016.01) | |
| C25B 9/06 | (2006.01) | |
| C25B 15/02 | (2006.01) | |
| H01M 8/0202 | (2016.01) | |
| H01M 8/241 | (2016.01) | |
| H01M 8/0254 | (2016.01) | |

(52) U.S. Cl.
CPC ....... *H01M 8/0247* (2013.01); *H01M 8/0265* (2013.01); *H01M 8/0267* (2013.01); *H01M 8/0432* (2013.01); *H01M 8/04305* (2013.01); *H01M 8/04574* (2013.01); *H01M 8/04641* (2013.01); *H01M 8/04701* (2013.01); *H01M 8/241* (2013.01); *H01M 8/0254* (2013.01); *Y02P 70/56* (2015.11)

(58) Field of Classification Search
CPC ........... H01M 8/04641; H01M 8/0247; H01M 8/241; H01M 8/04574; H01M 8/0432; H01M 8/04305; H01M 8/0254; C25B 9/063; C25B 15/02; Y02P 70/56
See application file for complete search history.

(56) References Cited

U.S. PATENT DOCUMENTS

| | | | |
|---|---|---|---|
| 2005/0095485 A1 | 5/2005 | Saulsbury et al. | |
| 2007/0292737 A1 | 12/2007 | Makita et al. | |
| 2007/0298299 A1 | 12/2007 | Izawa et al. | |
| 2008/0020261 A1 | 1/2008 | Hendricks et al. | |
| 2009/0024373 A1 | 1/2009 | Berning et al. | |
| 2009/0317686 A1 | 12/2009 | Huston et al. | |
| 2010/0297526 A1 | 11/2010 | Hendricks et al. | |
| 2010/0323279 A1 | 12/2010 | Fujiuchi et al. | |
| 2013/0034801 A1* | 2/2013 | Pavlik | H01M 8/242 429/518 |
| 2014/0370416 A1* | 12/2014 | Alhazmi | H01M 8/1004 429/492 |

FOREIGN PATENT DOCUMENTS

| | | | |
|---|---|---|---|
| FR | 2 985 610 A1 | 7/2013 | |
| JP | 2000-321353 | * 3/2000 | ............. H01M 8/04 |
| JP | 2005-293902 | 10/2005 | |
| JP | 2007-323852 | 12/2007 | |
| WO | WO 2007/032903 A2 | 3/2007 | |
| WO | WO 2012/085245 A1 | 6/2012 | |
| WO | WO 2013/088122 A1 | 6/2013 | |
| WO | WO 2015/029983 A1 | 3/2015 | |

OTHER PUBLICATIONS

Pharoah et al., "On the temperature distribution in polymer electrolyte fuel cells", Journal of Power Sources 195 (2010) 5235-5245 (Year: 2010).*

French Preliminary Search Report issued Aug. 3, 2016 in French Application 15 58895, filed Sep. 21, 2015 ( with English Translation of Categories of cited documents & Written Opinion).*
French Preliminary Search Report dated Aug. 3, 2016 in French Application 15 58894, filed Sep. 21, 2015 ( with English Translation of Categories of cited documents & Written Opinion ).
French Preliminary Search Report dated Jun. 16, 2016 in French Application 15 58898, filed Sep. 21, 2015 ( with English Translation of Categories of cited documents & Written Opinion).
French Preliminary Search Report dated May 12, 2016 in French Application 15 58896, filed Sep. 21, 2015 ( with English Translation of Categories of cited documents & Written Opinion).
Christophe Robin et al. "Development and Experimental validation of a PEM fuel cell 2D-model to study heterogeneities effects along large-area cell surface", International Journal of Hydrogen Energy 40, 2015, 20 pages.
Lara Jabbour et al. "Feasibility of in-plane GDL structuration: Impact on current density distribution in large-area Proton Exchange Membrane Fuel Cells", Journal of Power Sources 299, 2015 11 pages.
Stefan A. Freunberger et al. "Measuring the Current Distribution in PEFCs with Sub-Millimeter Resolution", Journal of the Electrochemical Society 153, 2006, 8 pages.
Sylvie Escribano et al. "Characterization of PEMFCs gas diffusion layers properties", Journal of Power sources 156, 2006, 6 pages.
Vahid Norouzifar et al. "Deformation of PEM fuel cell gas diffusion layers under compressive loading: An analytical approach", Journal of Power sources 264, 2014, 8 pages.
Ahmad El-Kharouf et al "Ex-situ characterization of gas diffusion layers for proton exchange membrane fuel cells", Journal of Power sources 218, 2012, 12 pages.
Eliton Fontana et al "Study of the effects of flow channel with non-uniform cross-sectional area on PEMFC species and heat transfer", International Journal of Heat and Mass Transfer 54, 11 pages.
Viral Mehta et al "Review and analysis of PEM fuel cell design and manufacturing", Journal of Power Sources 114, 2003, 22 pages.
V. Mishra et al. "Measurement and Prediction of Electrical Contact Resistance Between Gas Diffusion Layers and Bipolar Plate for Applications to PEM fuel Cells", ASME 2004 1 page.
Rajashankar Sadasivam et al. "Fully developed forced convection through trapezoidal and hexagonal ducts", International Journal of Heat and Mass Transfer 42, 1999, 11 pages.
Ha Na Yu et al. Composite endplates with pre-curvature for PEMFC (polymer electrolyte membrane fuel cell), Composite Structures 92, 2010, 6 pages.
Curtis Marr et al. "Composition and Performance modelling of catalyst layer in a proton exchange membrane fuel cell", Journal of Power Sources 77, 1999, 11 pages.
David. P. Wilkinson et al. "In-plane gradients in fuel cell structure and conditions for high performance", Journal of Power sources 113, 2003, 8 pages.
Christophe Robin et al "Developpement d'un modele predictif de duree de vie d'une pile PEMFC pour une application aeronautique:etude des interactions entre le Coeur de pile et les conditions d'operation du systeme", XP055271391, 2015, 3 pages.
Ying Shi et al, "A fractal permeability model for the gas diffusion layer of PEM fuel cells", Journal of Power Sources 160, 2006, 7 pages.
Dahua Shou et al "Effective Permeability of gas diffusion layer in proton exchange membrane fuel cells", International Journal of Hydrogen Energy 38, 2013, 8 pages.
Clemens Fink et al "Three-Dimensional simulation of polymer electrolyte membrane fuel cells with experimental validation" Electrochimica Acta 56, 2011, 12 pages.
Allen Hermann et al "Bipolar plates for PEM fuel cells: A review", International Journal of Hydrogen Energy 30, 2005, 6 pages.
Gen Inoue et al "Numerical Analysis of relative humidity distribution in polymer electrolyte fuel cell stack including cooling water", Journal of Power Sources 162, 2006, 13 pages.

* cited by examiner

DETERMINATION OF A SPATIAL DISTRIBUTION OF AN ELECTRICAL PRODUCTION PARAMETER OF AN ELECTROCHEMICAL CELL

CROSS-REFERENCE TO RELATED APPLICATION

The present application is based on and claims the benefit of priority to French Application No. 15-58895, which was filed on Sep. 21, 2015, the entire contents of which is incorporated herein by reference.

TECHNICAL FIELD

The field of the invention is that of electrochemical reactors including a stack of electrochemical cells, such as fuel cells and electrolyzers, and more precisely that of methods for determining a parameter representative of the electrical power production of the electrochemical cell, and that of methods for producing an electrochemical-cell bipolar plate.

STATE OF THE PRIOR ART

An electrochemical reactor such as a fuel cell or electrolyzer conventionally includes a stack of electrochemical cells that each comprise an anode and a cathode that are electrically separated from each other by an electrolyte, an electrochemical reaction taking place in each cell between two reactants that are continuously fed thereto. In the case of a hydrogen fuel cell, the fuel (hydrogen) is brought into contact with the anode, whereas the oxidant (oxygen), which is for example contained in air, is brought into contact with the cathode. The electrochemical reaction is subdivided into two half reactions, an oxidation reaction and a reduction reaction, which take place at the anode/electrolyte interface and at the cathode/electrolyte interface, respectively. To take place, the electrochemical reaction requires the presence of an ionic conductor between the two electrodes, namely the electrolyte, which is optionally contained in a polymer membrane, and an electronic conductor formed by the external electric circuit. The stack of cells is thus the site of the electrochemical reaction: the reactants must be supplied thereto and the products and any unreactive species must be removed therefrom, as must the heat produced during the reaction.

The cells are conventionally separated from one another by bipolar plates that ensure the electrical interconnection of the cells. The plates include a circuit for distributing fuel, formed on an anodic side, and a circuit for distributing oxidant, formed on a cathodic side opposite the anodic side. Each distributing circuit often takes the form of a network of channels for example arranged in parallel or in a serpentine arrangement, said channels being suitable for bringing the reactive species uniformly to the corresponding electrode. The bipolar plates may also include a cooling circuit formed from a network of internal ducts that allow a heat-transfer fluid to flow and thus the heat produced locally during the reaction in the cell to be removed.

Document FR2976732 describes one exemplary electrochemical cell produced so as to obtain uniform local heating within the cell in operation. This heating depends on the electrical current density at each point of the cell, which is itself dependent on the partial pressure of the reactive species. Specifically, considering here the cathodic side of the cell, the amount of oxygen contained in the gas flowing through the distributing circuit gradually decreases as the oxygen is consumed by the cell, thereby leading to a spatial variation in the electrical current density produced by the cell, and therefore to a spatial variation in the heating of the cell. To prevent this spatial nonuniformity in the heating of the cell, the electrical conductivity between the bipolar plate delivering the oxygen and the cell is adjusted locally so as to compensate for the decrease in oxygen partial pressure.

However, the uniformity of the spatial distribution of the effective temperature of the electrochemical cell could still be improved, so as to preserve the lifetime of the cell by limiting the rate of the degradation reactions of the various components of the cell and by decreasing mechanical stresses of thermal origin that are liable to decrease the mechanical strength of the components of the cell.

DISCLOSURE OF THE INVENTION

The objective of the invention is to remedy at least some of the drawbacks of the prior art, and more particularly to provide a method for determining the spatial distribution of a parameter representative of the local electrical power production of an electrochemical cell especially allowing the uniformity of the local temperature of the electrochemical cell in operation to be increased and thus the lifetime of the latter to be preserved.

For this purpose, the invention provides a method for determining a spatial distribution of a parameter of interest representative of the electrical power production of an electrochemical cell, said cell including two electrodes separated from one another by an electrolyte and placed between two bipolar plates suitable for bringing reactive species to the electrodes and for removing the heat produced by the cell in operation, comprising the following steps:

i) providing an electrochemical cell, within which the parameter of interest is distributed with an initial spatial distribution and for which the spatial distribution of a temperature within the electrochemical cell in operation has at least one local value higher than or equal to a preset maximum local value;

ii) defining a spatial distribution of a set-point temperature within the cell in operation, said distribution being such that the local temperature values are lower than preset maximum local values;

iii) measuring a spatial distribution of a first thermal quantity representative of the local removal of heat within said electrochemical cell in operation;

iv) estimating a spatial distribution of a second thermal quantity representative of the local production of heat within said electrochemical cell in operation, depending on said spatial distribution of the set-point temperature and on said spatial distribution of the first thermal quantity, so that the spatial distribution of the temperature of said electrochemical cell in operation, the first thermal quantity of which cell having said measured spatial distribution and the second thermal quantity of which cell having said estimated spatial distribution, is substantially equal to that of the set-point temperature; and v) determining a spatial distribution of the parameter of interest depending on the estimated spatial distribution of the second thermal quantity.

Thus, a spatial distribution of the parameter of interest is obtained and taking into account this spatial distribution in the considered electrochemical cell makes it possible to ensure that the latter has, in operation, a spatial distribution of temperature corresponding substantially to that of the set-point temperature. Thus, in operation the electrochemical cell then does not present zones in which the temperature is locally above preset maximum local values.

The supply of the electrochemical cell may include a phase of experimentally prototyping or numerically modeling an electrochemical cell, a phase of measuring the spatial distribution of the temperature within the electrochemical cell in operation, then a phase of comparing the measured spatial distribution of the temperature to a preset spatial distribution of a maximum temperature. The local values of this spatial distribution of maximum temperature are the what are called preset maximum local values. When at least one local value of the measured temperature is higher than or equal to a corresponding preset maximum local value, i.e. at one and the same position within the spatial distribution, the electrochemical cell is then supplied, i.e. considered, for the following steps of the determining method.

The set-point temperature may be defined so that the local temperature values are below the corresponding maximum local values. The set-point temperature may comprise substantially constant local values, or even a substantially constant local temperature gradient. It may have local values that are not constant within the spatial distribution but that remain below these preset maximum values. It may also comprise a local gradient that is not constant within the spatial distribution but that remains below the preset maximum values.

The measurement of the spatial distribution of the first thermal quantity may be an experimental measurement carried out on a considered electrochemical cell, which will have been manufactured beforehand, or a numerical measurement carried out on a numerical model of the considered electrochemical cell. The first thermal quantity may be the local flow rate of heat-transfer fluid flowing through a cooling circuit of a bipolar plate.

The estimation of the spatial distribution of the second thermal quantity may include:
a phase of producing a mesh, for example a two-dimensional or three-dimensional mesh, of a cooling circuit of at least one bipolar plate of the electrochemical cell, through which circuit a heat-transfer fluid is intended to flow; and
a phase of simulating numerically by computer the second thermal quantity on said mesh, by solving a discrete numerical model expressing the second thermal quantity as a function of the local temperature and of the first thermal quantity.

In this case, the numerical model takes into account the spatial distribution of the set-point temperature and the spatial distribution measured beforehand of the first thermal quantity. The discrete numerical model, which is what is called an electrochemical model, may be a relationship expressing a parameter representative of the local production of heat, for example the local heat flux, as a function of local temperature and of a parameter representative of the local removal of heat, for example the local flow rate of the heat-transfer fluid.

Thus, the electrochemical cell, the spatial distribution of the parameter of interest of which was obtained by the determining method, has in operation a spatial distribution of temperature substantially equal to that of the set-point temperature. Thus, the generation of unwanted new hotspots or new temperature nonuniformities that could appear if the spatial distribution of the parameter of interest were determined using an essentially thermal approach, i.e. an approach based on a comparison of the actual temperature of hotspots or nonuniformities and the set-point temperature, is avoided.

Preferably, the parameter of interest is chosen from a parameter representative of the electrical resistance of the electrochemical cell; a parameter representative of a contact resistance between at least one of the electrodes and the adjacent bipolar plate; a load of a catalyst present at least in one of the electrodes; and a parameter representative of a permeability of at least one electrode.

Preferably, the bipolar plates are formed from two sheets that are bonded to each other, each sheet including embossments forming, in what is called an external face, a circuit for distributing a reactive species, the embossments of the sheets together forming, in what are called internal faces that are opposite the external faces, a cooling circuit including cooling channels that communicate fluidically with one another between an inlet and an outlet of the cooling circuit. The external faces of the sheets are oriented toward an electrochemical-cell electrode. The cooling channels communicate fluidically with one another in the sense that, between the inlet and the outlet of the cooling circuit, they form a two-dimensional fluidic network, i.e. a non-linear network.

Preferably, the step of determining the spatial distribution of the parameter of interest is carried out also depending on a preset value of a parameter representative of the overall electrical power of the electrochemical cell. This parameter may be the overall electric power, namely the product of the voltage and current density measured across the terminals of the cell, or even the efficiency thereof, for example the voltage of the cell for a given current density. It is then possible both to manage the local temperature within the electrochemical cell, with the aim of optimizing the lifetime thereof, and to maintain a wanted electrical power.

Preferably, the parameter of interest is a parameter representative of the electrical resistance of the electrochemical cell; the first thermal quantity is an effective local temperature measured within the cell in operation; and the second thermal quantity is a quantity representative of a local difference between the effective temperature and the set-point temperature.

Preferably, step v) includes:
a sub-step of calculating a spatial distribution of a correctional coefficient from the spatial distribution of the second thermal quantity; and
a sub-step of determining the spatial distribution of the parameter of interest, by correlating the initial spatial distribution of the parameter of interest with the spatial distribution of the correctional coefficient.

Alternatively, step v) may include:
a sub-step of identifying at least one zone of the cell in which the second thermal quantity has an estimated local value above a preset threshold value;
a sub-step of determining the spatial distribution of the parameter of interest, by modifying the initial spatial distribution in the identified zone depending on the estimated local value of the second thermal quantity in this zone.

Moreover, the parameter of interest may be a parameter representative of the electrical resistance of the electrochemical cell, the first thermal quantity then being representative of the local removal of the heat produced by the cell in operation, and the second thermal quantity then being representative of the local production of heat by the cell in operation.

The first thermal quantity may be the measured effective local flow rate of a heat-transfer fluid flowing in a cooling circuit of a bipolar plate of the cell, and the second thermal quantity is the local heat flux produced by the cell in operation.

Step v) may include:
  a first sub-step of estimating the spatial distribution of the density of an electrical signal produced by the cell in operation, from the estimated spatial distribution of the produced heat flux; and
  a second sub-step of determining the spatial distribution of the parameter of interest, from the local density of the electrical signal.

The invention also relates to a method for producing an electrochemical-cell bipolar plate, including steps of:
  considering a reference electrochemical cell, said cell including two electrodes separated from each other by an electrolyte and placed between two bipolar plates suitable for bringing reactive species to the electrodes and for removing the heat produced by the cell in operation, the cell having an electrical resistance that is spatially distributed with an initial distribution;
  determining a spatial distribution of the electrical resistance, using the determining method according to any one of the preceding features; and
  producing said bipolar plate, in such a way that the electrical resistance has the determined spatial distribution.

Said bipolar plate being formed from two embossed sheets that are joined to each other by a plurality of spot welds distributed with an initial spatial distribution, the step of producing the bipolar plate may include modifying the spatial distribution of a parameter representative of a contact resistance between the two sheets depending on the determined spatial distribution.

The modification of the spatial distribution of the parameter representative of the contact resistance may include a modification of the distribution of the spot welds joining the sheets to each other depending on said determined spatial distribution of the electrical resistance.

The modification of the spatial distribution of the parameter representative of the contact resistance may include placing a coating having an electrical conductivity different from those of the sheets in zones identified beforehand from said determined spatial distribution of the electrical resistance.

The invention also relates to a method for producing an electrochemical cell including two electrodes separated from each other by an electrolyte and placed between two bipolar plates suitable for bringing reactive species to the electrodes and for removing the heat produced by the cell in operation, the method including the following steps of:
  considering a reference electrochemical cell having a parameter of interest representative of the electrical power production of the cell and distributed with an initial spatial distribution;
  determining a spatial distribution of the parameter of interest, using the determining method according to any one of the preceding features; and
  producing the electrochemical cell, on the basis of the reference electrochemical cell in which the parameter of interest has the determined spatial distribution.

By "on the basis of", what is meant is that the produced electrochemical cell has the same electrochemical properties as those of the reference cell, with the exception of the parameter of interest, which is distributed with the determined spatial distribution. The produced electrochemical cell may be the reference cell in which the initial spatial distribution of the parameter of interest has been modified to be substantially equal to the determined spatial distribution.

The invention also relates to a data storage medium containing instructions for implementing the determining method according to any one of the preceding features, these instructions being executable by a processor.

BRIEF DESCRIPTION OF THE DRAWINGS

Other aspects, aims, advantages and characteristics of the invention will be better apparent on reading the following detailed description of preferred embodiments of the latter, given by way of nonlimiting example and with reference to the appended drawings in which.

DETAILED DESCRIPTION OF PARTICULAR EMBODIMENTS

In the figures and in the rest of the description, references that are the same represent identical or similar components. In addition, the various components are not shown to scale so as to make the figures clearer. Moreover, the various embodiments and variants are not mutually exclusive and can be combined with one another. Unless indicated otherwise, the terms "substantially", "about", "of the order of" signify to within 10%.

The various embodiments and variants will be described with reference to a fuel cell and in particular to a hydrogen fuel cell the cathode of which is supplied with oxygen and the anode of which with hydrogen. However, the invention is generally applicable to any type of fuel cell, and in particular to those operating at low temperatures, i.e. temperatures below 250° C., and to electrochemical electrolyzers.

Figure 1A:
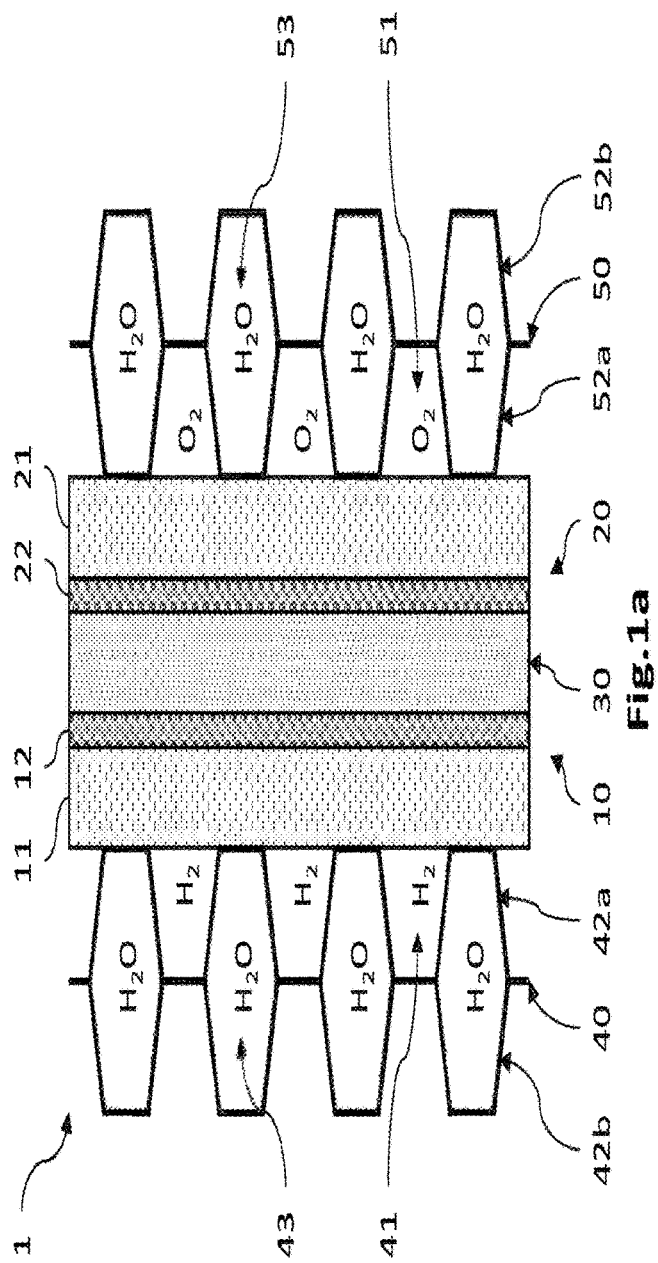
FIG. 1a is a schematic cross-sectional representation of an exemplary electrochemical cell.

FIG. 1a partially and schematically illustrates an exemplary electrochemical cell 1 belonging to a stack of cells of a fuel cell. The cell 1 includes an anode 10 and a cathode 20 that are separated from each other by an electrolyte here comprising a polymer membrane 30, the electrodes 10, 20 being placed between two bipolar plates 40, 50 that are suitable for bringing reactive species to the electrodes and for removing the heat produced during the electrochemical reaction.

The bipolar plates include a circuit 41 for distributing hydrogen, which circuit is located on an anodic side, and a circuit 51 for distributing oxygen, which circuit is located on a cathodic side. They are here formed from two metal sheets 42a, 42b; 52a, 52b, that are joined to one another by welded zones or spot welds and pressed so as to form the distributing circuits. The arrangement of the embossments also allows a cooling circuit 43, 53 to be produced inside the plates, through which a heat-transfer fluid may flow without making contact with the electrodes. Other bipolar-plate technologies may be used, for example the plates may be produced from a filled composite, for example a composite filled with graphite, the embossments of which are produced by molding.

Each electrode 10, 20 includes a gas diffusion layer (GDL) 11, 21 placed in contact with one of the bipolar plates 40, 50 and an active layer 12, 22 located between the membrane 30 and the diffusion layer 11, 21. The diffusion layers 11, 21 are made from a porous material that allows the reactive species to diffuse from the distributing circuit of the bipolar plates as far as the active layers, and the products generated by the electrochemical reaction to diffuse as far as the same distributing circuit. The active layers 12, 22 include materials suitable for allowing the oxidation and reduction reactions to take place at the respective interfaces of the anode and cathode with the membrane, for example an ionomer and a catalyst.

Figure 1B:
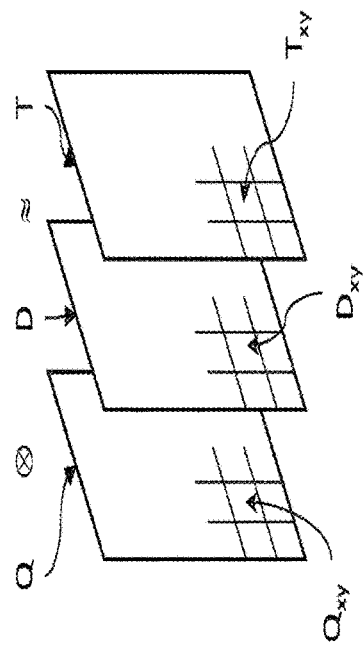
FIG. 1b is a schematic representation illustrating the correlational relationship between the spatial distribution of heat production and the spatial distribution of heat removal the result of which is the spatial distribution of the temperature of the electrochemical cell in operation.

FIG. 1b schematically shows the spatial distribution of the temperature T of the electrochemical cell as the resultant of a correlational relationship between the spatial distribution of a heat production source term, in other words a quantity representative of the production of heat by the cell, such as the produced heat flux Q, and the spatial distribution of a quantity representative of the removal of the heat produced, for example the mass flow rate D of the heat-transfer fluid in the cooling circuit.

Thus, contrary to the teaching of the prior art document cited above, it is not enough to increase the uniformity of the distribution of production of heat Q and therefore the heating of the cell to make the distribution of the temperature T of the cell uniform. Specifically, it is important to take into account both the presence or absence of local nonuniformities in the heat-production term Q and the presence or absence of local nonuniformities in the heat-removal term D.

The local production of heat, or more precisely the local produced heat flux Q, is directly proportional to the local electrical power production, or more precisely to the local current density I, as expressed by the relationship between their respective spatial distributions:

$$Q_{x,y} = I_{x,y}(\Delta H/2F - U_{x,y}) \quad (1)$$

where $\Delta H$ is the enthalpy of the electrochemical reaction, F is Faraday's constant, and $U_{x,y}$ is the spatial distribution of the local voltage of the cell, the enthalpy and the voltage possibly being considered to be almost uniform at every point of the cell. Thus, the production of heat is impacted by any nonuniformity due to fluidic parameters (dimensions of the circuits for distributing reactive species, etc.), electrochemical parameters (local properties of the electrodes and of the membrane, etc.), but also electrical parameters (electrical resistances of the various components of the cell, for example the resistivities of the materials and the contact resistances between the components of the cell, etc.), which parameters all influence the current-density distribution.

The removal of heat via the flow of heat-transfer fluid may also exhibit local nonuniformities especially due to minor head losses in the cooling circuit. These head losses are a result of the dimensions of the cooling circuit as produced during the production of the bipolar plates, and may lead to the formation of zones of high flow rate or of low flow rate within the cooling circuit.

In the context of the invention, it is sought to adapt the spatial distribution of a parameter of interest representative of the production of electrical power, and therefore of thermal energy, so that the spatial distribution of the temperature of the cell in operation corresponds to that of a set-point temperature, while taking into account the spatial distribution of the heat removal that the electrochemical cell exhibits.

Thus, an electrochemical cell the parameter of interest of which is spatially distributed with the distribution thus determined will have an effective temperature, or temperature during operation of the cell, substantially equal to the set-point temperature. This set-point temperature advantageously has a spatial distribution that is substantially uniform scalarwise or gradientwise. By uniform scalarwise, what is meant is that the local value of the temperature is substantially constant. By uniform gradientwise, what is meant is that the local temperature gradient is substantially constant. The local temperature values may however not be constant while remaining below preset maximum local values. The cell then does not contain zones of excess temperature, or hotspots, that on the one hand may increase the rate of the degradation reactions of the components of the cell, and on the other hand may generate mechanical stresses liable to degrade the mechanical strength of the components of the cell. The lifetime of the electrochemical cell is then preserved. By hotspot, what is for example meant is a zone of the cell that contains a temperature peak or a temperature-gradient peak. More precisely, a hotspot may be a zone where the difference between the local temperature and the inlet temperature of the cooling circuit is larger than the product of a coefficient and the temperature difference between the inlet and outlet of the cooling circuit, the coefficient possibly being about 1.2 to 3 or more, and preferably being about 1.5. By way of example, for a temperature of 77° C. at the inlet of the cooling circuit and of 80° C. at the outlet of the circuit, and for a coefficient equal to 1.5, a hotspot is a zone of the cell in which the local temperature exceeds 81.5° C.

By spatial distribution of a parameter, what is meant is the local value of this parameter at every point in the cell, or more precisely, at every point (x,y) in a plane parallel to the cell in what is called the active zone corresponding to the areal extent of the active layers of the electrodes.

By the temperature of the cell, what is meant is the temperature of any one of the components of the cell, for example the temperature of one of the bipolar plates or even one of the electrodes. The temperature of the cell may thus correspond locally to the temperature of the heat-transfer fluid in the cooling circuit.

By parameter representative of the production of electrical power, what is meant is a parameter the value of which locally influences the current density $I_{x,y}$. It may be the electrical resistance R of the cell, which especially depends on the resistivity of the various components of the cell (bipolar plates, diffusion layers, active layers, membrane) and on the electrical contact resistance between each of these components, in particular between the two sheets of the bipolar plate and between the bipolar plate and the electrode. It may also be the load $C_{x,y}$ (or loading or weight per unit area) of catalyst in the active layer insofar as it directly influences the local current density $I_{x,y}$, or even the permeability k of the diffusion layer of the electrodes, which determines the amount of reactive species capable of diffusing locally as far as the active layer.

Lastly, by parameter representative of heat removal, what is meant is a parameter the value of which represents the capacity of the cell to locally remove the produced heat. It may in particular be the local mass or volume flow rate of the heat-transfer fluid flowing in the cooling circuit.

Figure 2:
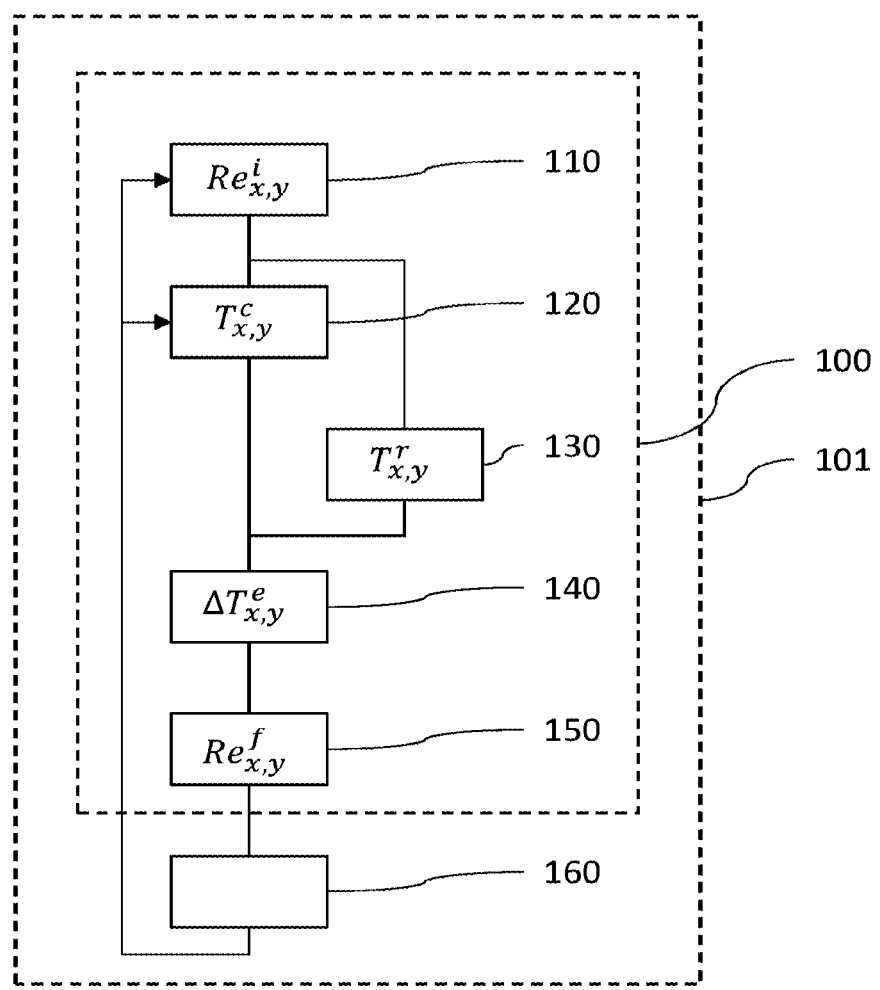
FIG. 2 is a flowchart of a method for determining the spatial distribution of the electrical resistance of the electrochemical cell according to a first embodiment.

FIG. 2 is a flowchart of a method for determining the spatial distribution of a parameter of interest representative of the production of electrical power, according to a first embodiment. In this example, the parameter of interest is representative of the electrical resistance R of the electrochemical cell and here corresponds to the electrical resistance R the value of which has a direct influence on the local electrical current density $I_{x,y}$ produced locally during the electrochemical reaction and therefore on the local produced heat flux $Q_{x,y}$.

Generally, according to this first embodiment, an optimized spatial distribution $R_{x,y}^f$ of the electrical resistance R is determined from an estimation of the spatial distribution $\Delta T_{x,y}^e$ of a difference $\Delta T^e$ between an effective temperature $T^r$ of the cell in operation, for an electrical resistance distributed with a given initial distribution, and a preset set-point temperature $T^c$. It is then possible to modify the initial electrical resistance $R_{x,y}^i$ of the cell so that it has the optimized distribution $R_{x,y}^f$, so that the effective temperature $T^r$ of the modified cell is substantially equal to the set-point temperature $T^c$.

The electrical resistance R of the cell here corresponds to the sum of the resistances of the various components of the cell, namely mainly the resistance $R_{GDL,a}$ and $R_{GDL,c}$ of the anodic and cathodic diffusion layers, the resistance $R_m$ of the membrane, the resistance $R_{PB}$ of a bipolar plate, and the contact resistance $Rc_{GDL/BP}$ between the diffusion layer and the bipolar plate and the contact resistance $Rc_{PB}$ between the two metal sheets of the bipolar plate. It may be estimated beforehand or measured locally on cell samples.

In a first step 110, a reference electrochemical cell is defined within which the electrical resistance R of the cell is spatially distributed with an initial distribution $R_{x,y}^i$. The cell has a structure identical or similar to that described with reference to FIG. 1. The initial spatial distribution $R_{x,y}^i$ of the electrical resistance may be substantially uniform, i.e. here it has a value that is substantially constant at every point in the active zone. By way of example, the resistances of the various components of the cell are considered to be substantially constant at every point in the active zone, and the spot welds liable to locally modify the contact resistance of the bipolar plates are considered to be distributed substantially uniformly within the cell.

In a step 120, a spatial distribution $T_{x,y}^c$ of a set-point temperature $T^c$ of the reference cell when the latter is in operation and producing a total current density hot for a given voltage $U_{tot}$ is defined. To the first order, the set-point temperature $T^c$ of the cell may correspond to a temperature of the heat-transfer fluid within the cooling circuit, the distribution of this temperature then especially depending on its values at the inlet $T_e^c$ and outlet $T_g^c$ of the cooling circuit. By way of illustration, the inlet temperature may be set beforehand, for example to 75° C., and the outlet temperature may be estimated from the thermal power $P_{th}$ to be removed, which may be evaluated using the relationship $P_{th} = I_{tot} (\Delta H/2F - U_{tot})$. The outlet temperature $T_g^c$ is then estimated by correlating the thermal power $P_{th}$ estimated beforehand with the average total flow rate $<D_{tot}>$ of the heat-transfer fluid in the cooling circuit, by means of the heat capacity $c_p$ of the heat-transfer fluid. It is then possible to define the spatial distribution $T_{x,y}^c$ of the set-point temperature $T^c$ from the values of the temperature of the heat-transfer fluid at the inlet $T_e^c$ and outlet $T_g^c$ of the cooling circuit, the distribution $T_{x,y}^c$ advantageously being uniform gradientwise, i.e. the local set-point temperature gradient is substantially constant.

In a step 130, a spatial distribution $T_{x,y}^r$ of a first thermal quantity representative of the temperature of the cell in operation is obtained. The first thermal quantity is here the effective temperature $T^r$ of the electrochemical cell when it is operating under the same operating conditions as those considered in step 120. This distribution $T_{x,y}^r$ is not estimated but is the result of a measurement by experimental or numerical means. It may thus be obtained by experimental measurement of an electrochemical cell having the same properties as the reference cell defined in step 110, for example by means of a S++ board sold by "S++ Simulation Services", including an invasive plate inserted between two bipolar plates and suitable for measuring a spatial distribution of temperature. The distribution $T_{x,y}^r$ of effective temperature may also be obtained by numerical simulation from an electrochemical cell model, for example that described in the publication by Inoue et al., *Numerical analysis of relative humidity distribution in polymer electrolyte fuel cell stack including cooling water*, J. Power Sources 162 (2006) 81-93.

The distribution $T_{x,y}^r$ of the effective temperature $T^r$ obtained by experimental or numerical measurement thus takes into account local nonuniformities in the produced heat flux, which depends on local current density, and local nonuniformities in heat removal, which especially depends on the local flow rate of the heat-transfer fluid in the cooling circuit.

In a step 140, the spatial distribution of a second thermal quantity is estimated, here a quantity $\Delta T^e$ representative of a local difference between the effective temperature $T^r$ and the set-point temperature $T^c$. This quantity of local difference $\Delta T^e$ is estimated from the spatial distribution $T_{x,y}^c$ of the set-point temperature $T^c$ defined in step 120 and from the spatial distribution $T_{x,y}^r$ of the effective temperature $T^r$ measured in step 130. It may be the difference between the local value of the effective temperature and that of the set-point temperature, or a ratio of these values, inter alia. Here, the term-to-term difference between the distributions of the effective temperature and set-point temperature are considered: $\Delta T_{x,y}^e = T_{x,y}^r - T_{x,y}^c$.

Next, in a step 150, the spatial distribution $R_{x,y}^f$ of the parameter of interest R is determined depending on the spatial distribution $\Delta T_{x,y}^e$ of the local difference $\Delta T^e$.

Figure 3:
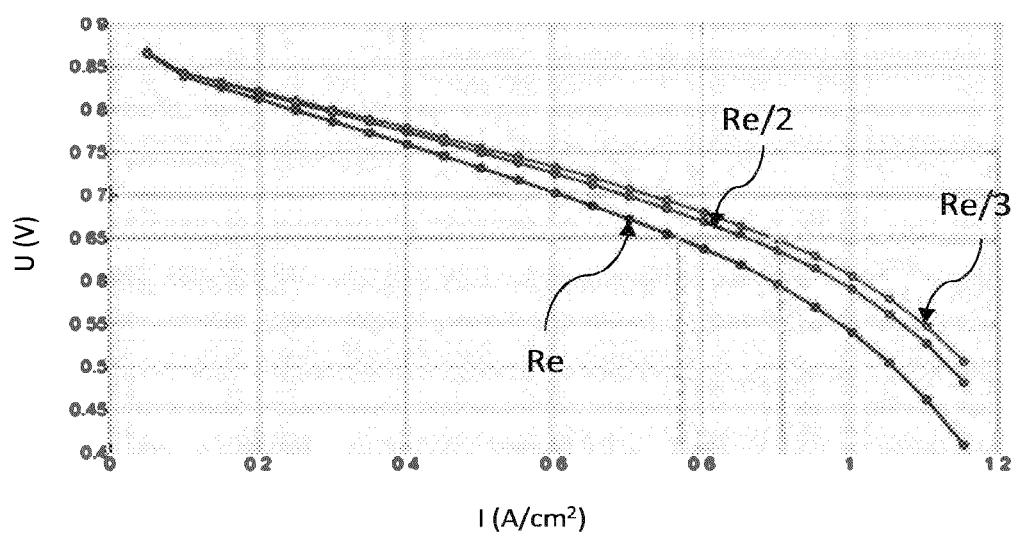
FIG. 3 illustrates exemplary polarization curves that show the variation in the electrical voltage of the cell as a function of the local electrical current density, for various values of local electrical resistance.

According to a first variant, a correctional coefficient is firstly calculated, the spatial distribution of which is proportional term-to-term to that $\Delta T_{x,y}^e$ of the local difference $\Delta T^e$. By way of example, the correctional coefficient varies continuously between a minimum value, for example lower than or equal to unity, and a maximum value, as the local difference varies between a substantially zero value and a maximum value, respectively. With reference to FIG. 3, the maximum value of the correctional coefficient may be determined from polarization curves of the reference cell for various local values of the electrical resistance. In this example of polarization curves issued from an experimentally validated electrochemical cell model, the local current density I decreases from 0.93 A/m² to 0.77 A/m² when the electrical resistance of the cell is multiplied by 3, for a cell voltage U equal to 0.65 V. This decrease of 17% in the local current density leads to a substantially identical decrease in the local production of heat. Next, the spatial distribution $R_{x,y}^f$ of the electrical resistance R may be determined by correlation, for example by a term-to-term multiplication, of the initial spatial distribution $R_{x,y}^i$ of the electrical resistance R with the spatial distribution of the correctional coefficient.

According to a second variant, firstly at least one zone $Z_i$ of the cell in which the difference $\Delta T^e$ has a value above a preset threshold value is identified, the threshold value for example being representative of a hotspot. Next, the spatial distribution $R_{x,y}^f$ of the electrical resistance R is determined by modifying the initial spatial distribution $R_{x,y}^i$ in the identified zone $Z_i$ depending on the local value of the difference $\Delta T^e$ in this zone. By way of example, the initial spatial distribution $R_{x,y}^i$ may be modified locally using a correctional coefficient the value of which is proportional to that of the difference $\Delta T^e$ in this zone. As in the first variant, the correctional coefficient continuously varies between a minimum value and a maximum value that are determined beforehand using polarization curves similar or identical to those in FIG. 3.

Thus, a spatial distribution $R_{x,y}^f$ of the electrical resistance R of the electrochemical cell is obtained. It is then possible to modify the initial distribution $R_{x,y}^i$ of the electrical resistance R of the reference cell so that it has the new distribution determined in step 150. The cell thus optimized then has, in operation, an effective temperature the spatial distribution of which is substantially equal to that of the set-point temperature. Insofar as the distribution of the set-point temperature is advantageously uniform, the cell in operation has an effective temperature the distribution of which is also substantially uniform, thus allowing the lifetime of the cell to be preserved.

Figure 4:
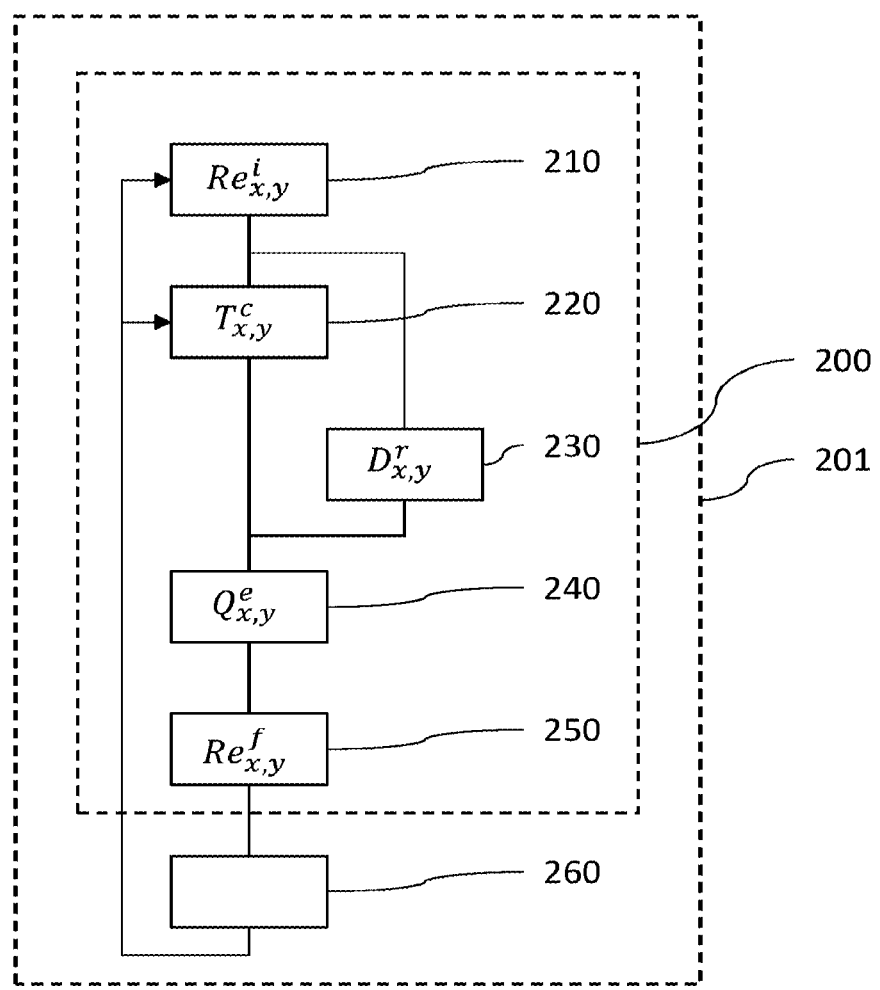
FIG. 4 is a flowchart of a method for determining the spatial distribution of the electrical resistance of the electrochemical cell according to a second embodiment.

FIG. 4 is a flowchart of a method for determining the spatial distribution of a parameter of interest representative of the production of electrical power, according to a second embodiment. In this example, the parameter of interest is representative of the electrical resistance of the electrochemical cell, the value of which has a direct influence on the electrical current density produced locally during the electrochemical reaction. It here corresponds to the electrical resistance R of the cell.

Generally, according to this second embodiment, the spatial distribution $R_{x,y}^f$ of the electrical resistance R is determined from the estimation of the spatial distribution of the production of heat necessary to obtain the spatial distribution of a set-point temperature, while taking into account the spatial distribution of a thermal quantity representative of the effective heat removal in the cell. It is then possible to modify the electrical resistance R of the cell so that it has an optimized spatial distribution, so that the effective temperature is then substantially equal to the set-point temperature. The electrochemical cell, the parameter of interest of which is spatially distributed with the optimized distribution, has in operation a temperature substantially equal to the set-point temperature. Unwanted new hotspots or new temperature nonuniformities are not formed.

This approach, which is what may be referred to as an electrochemical and no longer essentially thermal approach, is particularly advantageous when at least one bipolar plate, or even both bipolar plates, of the electrochemical cell are formed from sheets that are bonded to one another and that contain embossments that define a two-dimensional cooling circuit. The embossments of each sheet, in the faces referred to as the external faces of the sheets, i.e. the faces oriented toward an electrode, define a circuit for distributing reactive species. In the internal faces, i.e. the faces opposite the external faces, the embossments form a cooling circuit through which a heat-transfer fluid is intended to flow. The cooling circuit is what is called linear when the cooling channels do not communicate with one another, i.e. when the heat-transfer fluid, between the inlet and outlet of the cooling circuit, cannot substantially pass from one cooling channel to another. The cooling circuit is what is called two-dimensional when the cooling channels communicate with one another, so as to form a two-dimensional fluidic network that is non-linear. This is especially the case when the distributing channels of a sheet are not parallel to those of the other sheet.

In a first step 210, a reference electrochemical cell is defined or supplied, within which the electrical resistance R of the cell is spatially distributed with an initial distribution $R_{x,y}^i$. The initial spatial distribution $R_{x,y}^i$ of the electrical resistance R may be substantially uniform scalarwise, so that its local value is substantially constant at every point in the active zone. The cell has a structure that is identical or similar to that described with reference to FIG. 1 and this step is similar or identical to the step 110 described above. The considered electrochemical cell then has, in operation, a spatial distribution of temperature at least one local value of which is higher than or equal to a preset maximum local value. The latter may be constant or differ depending on the considered point of the electrochemical cell. This step may include:

- a phase of experimentally prototyping or numerically modeling an electrochemical cell;
- a phase of measuring the spatial distribution of the temperature within the electrochemical cell in operation; then
- a phase of comparing the measured spatial distribution of the temperature to a preset spatial distribution of a maximum temperature. The local values of this spatial distribution of maximum temperature are the what are called preset maximum local values.

When at least one local value of the measured temperature is higher than or equal to a corresponding preset maximum local value, i.e. at one and the same position within the spatial distribution, the electrochemical cell is then supplied, i.e. considered, for the following steps of the determining method.

In a step 220, a spatial distribution $T_{x,y}^c$ of a set-point temperature $T^c$ of the reference cell when the latter is in operation and producing a total current density $I_{tot}$ for a given voltage $U_{tot}$ is defined. This step is similar or identical to the step 120 described above. The local values of the spatial distribution of the set-point temperature are lower than corresponding maximum local values.

Optionally, it is advantageous to specify the spatial distribution $T_{x,y}^c$ of the set-point temperature $T^c$ as a function of the spatial distribution of the concentration of reactive species in the active zone between the inlet and outlet of the corresponding distributing circuit. Specifically, the consumption of reactive specie within the active area of the cell leads to a gradual decrease in the concentration of reactive specie along the distributing circuit. This gradual decrease results in a decrease in the local current density produced by the cell and therefore in the local production of heat, thereby leading to the formation of nonuniformities in the temperature of the cell. To compensate for this gradual decrease in the production of heat, it is advantageous to define a set-point temperature that takes into account the decrease in the concentration of reactive specie, so that the effective temperature of the cell in operation corresponds to the set-point temperature, the latter advantageously having a uniform spatial distribution. To do this, the spatial distribution $\tilde{T}_{x,y}^c$ of the specified set-point temperature $\tilde{T}^c$ may for example be written:

$$\tilde{T}_{x,y}^c = T_{x,y}^c + K^i \cdot [\max(c_{x,y}^i) - c_{x,y}^i] \quad (2)$$

where $c_{x,y}^i$ is the spatial distribution of the concentration $c^i$ in reactive specie i, for example in oxygen, and $K^i$ is a positive constant, for example close to 1, which may be subsequently adjusted. The spatial distribution $c_{x,y}^i$ of the concentration $c^i$ may be estimated to the first order from the routing of the channels of the distributing circuit of the reactive specie in question and by assuming a uniform consumption throughout the active zone. It may also be more accurately determined by numerical or experimental measurement of the spatial distribution of the current density in a cell that is similar or identical to the reference cell, which allows the spatial distribution of the concentration of the reactive species to be deduced. Other relationships (2) may be used to specify the spatial distribution of the set-point temperature while taking into account the spatial variation in the concentration of reactive specie. Thus, a spatial distribution $\tilde{T}_{x,y}^c$ of the set-point temperature $\tilde{T}^c$ is obtained that thus allows a distribution of the effective temperature of the cell to be obtained the uniformity of which is improved.

Moreover, optionally and possibly complementarily with the step of specifying the set-point temperature described above, it is advantageous to specify the spatial distribution $T_{x,y}^c$ of the set-point temperature $T^c$ as a function of the spatial distribution $\varphi_{x,y}$ of the relative humidity $\varphi$ in the distributing circuits. The relative humidity $\varphi$ is defined conventionally as the ratio of the partial pressure $P_{H2O}$ of the water vapor contained locally in the gas flowing through the distributing circuit to the saturated vapor pressure $P_{sat}$. The relative humidity $\varphi$ has an effect on the rate of the electrochemical reactions. Thus, to compensate for the local variation in relative humidity, it is advantageous to define a set-point temperature that compensates for this local variation, for example for local humidification or dehumidification in the distributing circuits, so that the effective temperature of the cell in operation has a uniform spatial distribution. To do this, the spatial distribution $\tilde{T}'^c_{x,y}$ of the specified set-point temperature $\tilde{T}'^c$ may for example be written:

$$\tilde{T}'^c_{x,y} + T_{x,y}^c + K^\varphi \cdot [\varphi_{x,y}/\varphi_{in}] \quad (3)$$

where $\varphi_{x,y}$ is the spatial distribution of the relative humidity $\varphi$ in the distributing circuit, $\varphi_{in}$ is the relative humidity at the inlet of the distributing circuit, and $K^\varphi$ is a positive constant, for example close to 1, which may be subsequently adjusted. The distribution $\varphi_{x,y}$ of the relative humidity $\varphi$ may be estimated to the first order from the routing of the channels of the distributing circuit in question and by assuming a uniform current density throughout the active zone. It may also be more accurately determined by numerical or experimental measurement of the spatial distribution of the current density in a cell that is similar or identical to the reference cell, which allows the spatial distribution of the relative humidity to be deduced. Other relationships (3) may be used to specify the spatial distribution of the set-point temperature on the basis of the spatial variation in the relative humidity. Thus, a spatial distribution $\tilde{T}_{x,y}^c$ of the set-point temperature $\tilde{T}^c$ is obtained that thus allows a distribution of the effective temperature of the cell to be obtained the uniformity of which is improved.

In a step 230, a spatial distribution $D_{x,y}^r$ of a first thermal quantity representative of the removal of heat $D^r$ within the cell in operation is obtained. The first thermal quantity is here the mass flow rate $D^r$ of heat-transfer fluid in the cooling circuit. This distribution $D_{x,y}^r$ is not estimated but is the result of a measurement by experimental or numerical means. It may thus be obtained by experimental measurement of an electrochemical cell having the same properties as the reference cell defined in step 210, for example by means of a particle image velocimetry (PIV) technique or any other suitable technique, carried out on a cooling circuit having the same dimensional characteristics as that of the reference cell. The distribution $D_{x,y}^r$ of the mass flow rate $D^r$ may also be obtained by numerical simulation using a flow simulation software package such as FLUENT or COMSOL for example.

In a step 240, the spatial distribution $Q_{x,y}^e$ of a second thermal quantity $Q^e$ is estimated from said spatial distribution $T_{x,y}^c$ of the set-point temperature $T^c$ defined in step 220 and from said spatial distribution $D_{x,y}^r$ of the heat-transfer fluid flow rate $D^r$ obtained in step 230. The second thermal quantity is representative of the local production of heat and here corresponds to the local heat flux $Q^e$ that the heat-transfer fluid $D^r$ removes to obtain the set-point temperature $T^c$.

Figure 5:
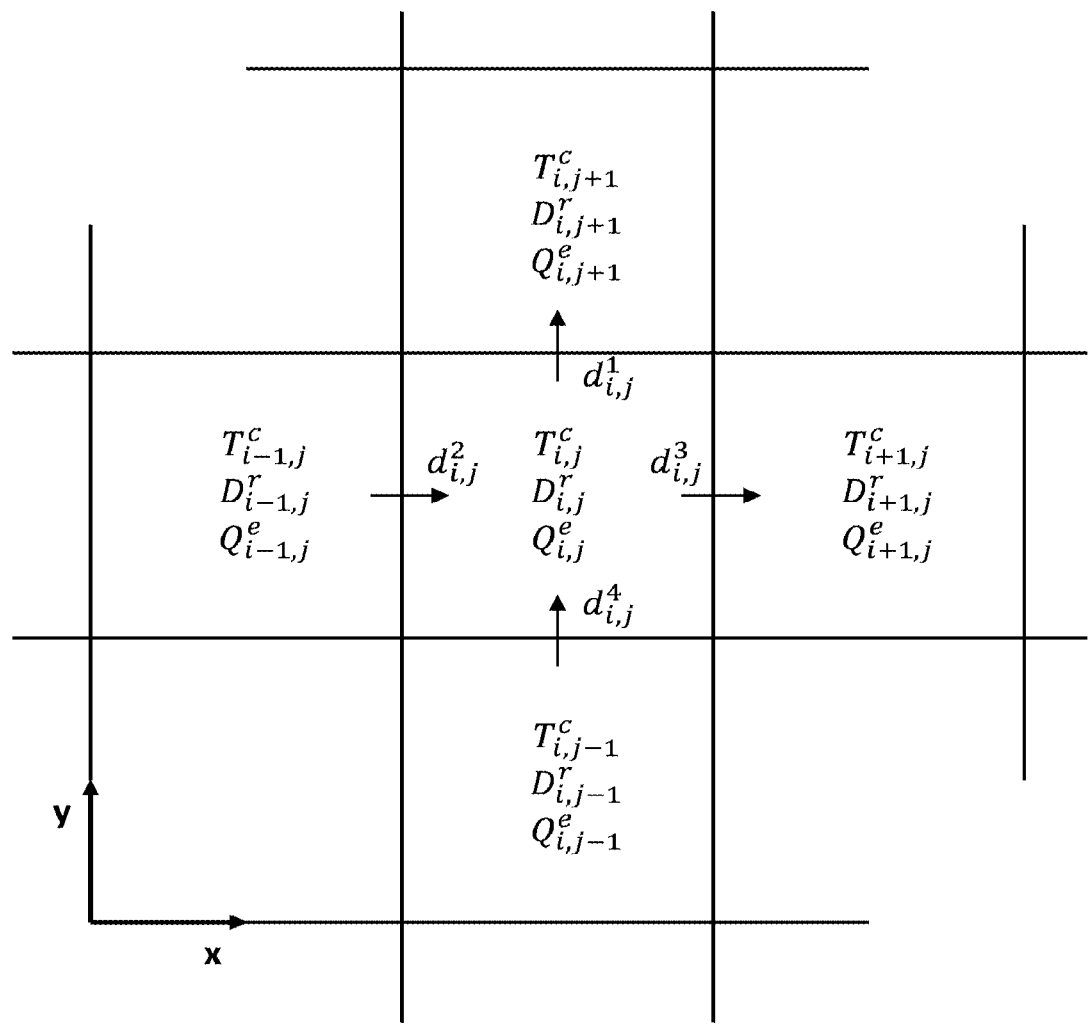
FIG. 5 is an example of a mesh of the cooling circuit, in which each mesh cell includes a local heat production term $Q_{i,j}^e$, a local heat removal term $D_{i,j}^r$, and a temperature $T_{i,j}^c$.

To do this, as illustrated in FIG. 5, the cooling circuit is discretized into a two-dimensional or three-dimensional, here two-dimensional, mesh each mesh cell of which is an elementary volume (i,j) passed through by the heat-transfer fluid. Thus, each mesh cell (i,j) of the distributing circuit has two known quantities: the local set-point temperature $T_{i,j}^c$ and the local flow rate $D_{i,j}^r$ of the heat-transfer fluid; and a quantity to be determined: the local produced heat flux $Q_{i,j}^e$. Next, the amount of heat and fluid exchanged between the mesh cell in question and the adjacent mesh cells is calculated by determining, on the one hand, the temperature differences and, on the other hand, the flow rates of the heat-transfer fluid at the four facets of the mesh cell in question. This calculation may be carried out by numerical simulation by computer, on said mesh. This amounts to solving a discrete numerical model expressing the second thermal quantity, namely here the local heat flux, as a function of the local temperature and of the first thermal quantity, namely here the local flow rate of the heat-transfer fluid. The numerical model, which is what is referred to as an electrochemical model, may be expressed by relationship (6).

The temperature differences at the four facets of the mesh cell (i,j) may be calculated in the following way:

$$\delta T_{i,j}^1 = T_{i,j}^c - T_{i,j+1}^c \quad (4\text{-}1)$$

$$\delta T_{i,j}^2 = T_{i,j}^c - T_{i-1,j}^c \quad (4\text{-}2)$$

$$\delta T_{i,j}^3 = T_{i,j}^c - T_{i+1,j}^c \quad (4\text{-}3)$$

$$\delta T_{i,j}^4 = T_{i,j}^c - T_{i,j-1}^c \quad (4\text{-}4)$$

The flow rates of the heat-transfer fluid at the four facets of the mesh cell (i,j) may be obtained by projecting the mass flow rate $D_{i,j}^r$ (here a vectorial datum) onto the vectors $e_x$ and $e_y$ passing through the mesh cells (i−1,j), (i,j) and (i+1,j), and through the mesh cells (i,j−1), (i,j) and (i,j+1), respectively:

$$d_{i,j}^1 (D_{i,j}^r \cdot e_y + D_{i,j+1}^r \cdot e_y)/2 \quad (5\text{-}1)$$

$$d_{i,j}^2 (D_{i,j}^r \cdot e_x + D_{i-1,j}^r \cdot e_x)/2 \quad (5\text{-}2)$$

$$d_{i,j}^3 (D_{i,j}^r \cdot e_x + D_{i+1,j}^r \cdot e_x)/2 \quad (5\text{-}3)$$

$$d_{i,j}^4 (D_{i,j}^r \cdot e_y + D_{i,j-1}^r \cdot e_y)/2 \quad (5\text{-}4)$$

By convention, the local flow rate $d_{i,j}$ is considered to be positive when the fluid enters into the mesh cell (i,j) and negative when the fluid exits therefrom.

Lastly, the spatial distribution $Q_{x,y}^e$ of the heat flux $Q^e$ produced by the cell is calculated from the relationship:

$$Q_{x,y}^e \approx Q_{i,j}^e = \Sigma_{k=1}^4 d_{i,j}^k \cdot c_p \cdot \delta T_{i,j}^k \quad (6)$$

Thus, the spatial distribution of the heat flux $Q^e$ that the cell must produce for the effective temperature distribution to correspond to that of the set-point temperature is obtained, the distribution of the effective mass flow rate of the heat-transfer fluid in the distributing circuit being known.

In a step 250, the spatial distribution $R_{x,y}^f$ of the electrical resistance R is determined depending on the spatial distribution $Q_{x,y}^e$ of the produced heat flux $Q^e$. To do this, it is possible to firstly estimate the spatial distribution of the density of an electrical signal produced by the cell in operation, for example the current density $I^e$, from the estimated spatial distribution $Q_{x,y}^e$ of the produced heat flux $Q^e$. Insofar as the produced heat flux $Q^e$ is approximately proportional to the current density $I^e$, the latter may be determined from the relationship:

$$I_{x,y}^e = Q_{x,y}^e \cdot \frac{I_{tot}}{Q_{tot}} \quad (7)$$

where $I_{tot}$ is the total current density delivered by the electrochemical cell in operation, and $Q_{tot}$ is the total produced heat flux, which is obtained by integrating the spatial distribution $Q_{x,y}^e$ over all the active area.

Next, the new spatial distribution $R_{x,y}^f$ of the electrical resistance R is determined from the local density of the electrical current $I_{x,y}^e$. To do this, one approach consists in determining the minimum $R_{min}$ and maximum $R_{max}$ values of the electrical resistance of the cell in the active zone. It may be an experimental measurement of a cell sample having the same properties as those of the reference cell, or a measurement by numerical simulation, for example using the software package COMSOL Multiphysics®. Next, the spatial distribution $R_{x,y}^f$ is calculated, for example using the relationship:

$$R_{x,y}^f = \min\left(R_{max}, R_{min} \frac{I_{max}^e}{I_{x,y}^e}\right) \quad (8)$$

where $I_{max}^e$ is the maximum value of the local current density $I_{x,y}^e$. The local electrical resistance thus varies linearly between the minimum $R_{min}$ and maximum $R_{max}$ values as a function of the local value of the current density $I^e$. Of course, any other law, for example a polynomial, exponential or logarithmic law, causing the local electrical resistance to vary so that the minimum value $R_{min}$ corresponds to a maximum local current density and vice versa, may be used. The minimum $R_{min}$ and maximum $R_{max}$ values may be preset depending on the overall electric power UI wanted for the electrochemical cell, where U is the electrical voltage and I the electrical current density measured across the terminals of the cell.

Thus, a spatial distribution $R_{x,y}^f$ of the electrical resistance R taking into account the distribution of production of electrical power $I^e$ and therefore of thermal energy $Q^e$, and which ensures the effective temperature of the cell in operation corresponds to the set-point temperature $T^c$, has been determined, while also taking into account the effective removal $D^r$ of heat by the cooling circuit. Insofar as the set-point temperature is advantageously spatially uniform, a cell the electrical resistance R of which is distributed with the spatial distribution $R_{x,y}^f$ has, when it is operating at the polarization point $U_{tot}$ and $I_{tot}$, an effective temperature the uniformity of the spatial distribution of which is optimized.

A method for producing a bipolar plate of the electrochemical cell will now be described. An electrochemical cell that is identical or similar to the reference cell defined in steps 110 and 210 is considered. It includes two electrodes separated from each other by an electrolyte and placed between two bipolar plates suitable for bringing reactive species to the electrodes and for removing the heat produced by the cell in operation, the cell having an electrical resistance R that is spatially distributed with an initial distribution $R_{x,y}^i$; Using the method described above with reference to FIGS. 2 and 4, a spatial distribution $R_{x,y}^f$ of the electrical resistance R of the electrochemical cell is determined. Next, in a step 160 (FIG. 2) or 260 (FIG. 4), the bipolar plate is produced in such a way that the electrical resistance R has the determined spatial distribution $R_{x,y}^f$.

According to one embodiment, one and/or other of the bipolar plates is formed from two sheets comprising embossments obtained by pressing or molding, said sheets being joined to one another. It is possible to modify the contact resistance between the two sheets via the presence or absence of spot welds (FIG. 6a) and/or via the presence of a coating placed locally between the two sheets (FIG. 6b) so that the electrical resistance R has the spatial distribution $R_{x,y}^f$ determined beforehand.

Figure 6A:
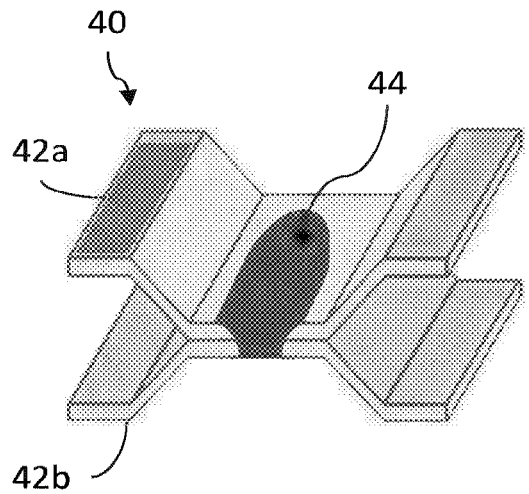
FIG. 6a is a schematic perspective representation of a portion of a bipolar plate formed from two sheets joined to each other by a spot weld.

As illustrated in FIG. 6a, the two sheets 42a, 42b, which here are made of metal, may be joined to one another by a plurality of spot welds or welded zones 44 that are distributed with an initial spatial distribution. The size of the spot welds 44 and their density locally modifies the contact resistance $R_{BP}$ between the two metal sheets 42a, 42b and therefore the electrical resistance R of the cell. More precisely, a spot weld causes a local increase in the conductivity of the bipolar plate and therefore a decrease in the contact resistance thereof. In this example, the sheets are produced from a metal, the embossments preferably being produced by pressing.

Figure 6B:
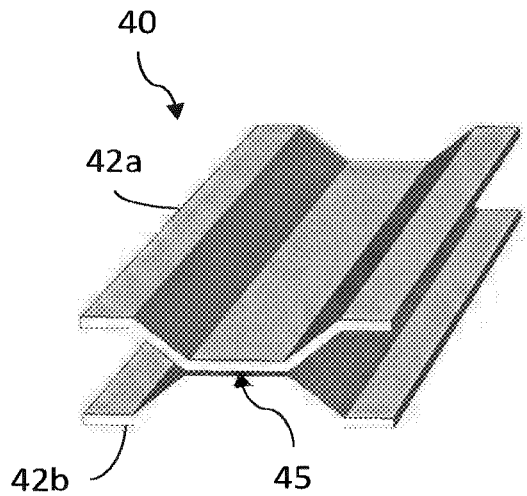
FIG. 6b is a variant of FIG. 6a in which a coating product is located between the two sheets.

As illustrated in FIG. 6b, the two sheets 42a, 42b may locally include a coating 45 making contact with the two sheets, the material and/or thickness of which are chosen depending on the desired modification of the contact resistance. The material has a conductivity and a thickness that are chosen to ensure a local modification of the contact resistance $R_{BP}$ of the bipolar plate and therefore of the electrical resistance R of the cell. In particular, the electrical conductivity of the coating is different from that of the sheets of the bipolar plate. By way of illustration, the material may be chosen from the materials listed in Table 2 of the publication by Herman et al., *Bipolar plates for PEM fuel cells: A review*, International Journal of Hydrogen Energy, 30 (2005), 1297-1302. Positioning the coating layer between the two sheets especially has the advantage of preventing any risk of contact between the coating material and electrodes that is liable to degrade the electrochemical properties thereof. In this example, the sheets may be produced from a material other than a metal, for example a composite filled with graphite. The sheets are then plates the embossments of which are preferably produced by molding.

Figure 6C:
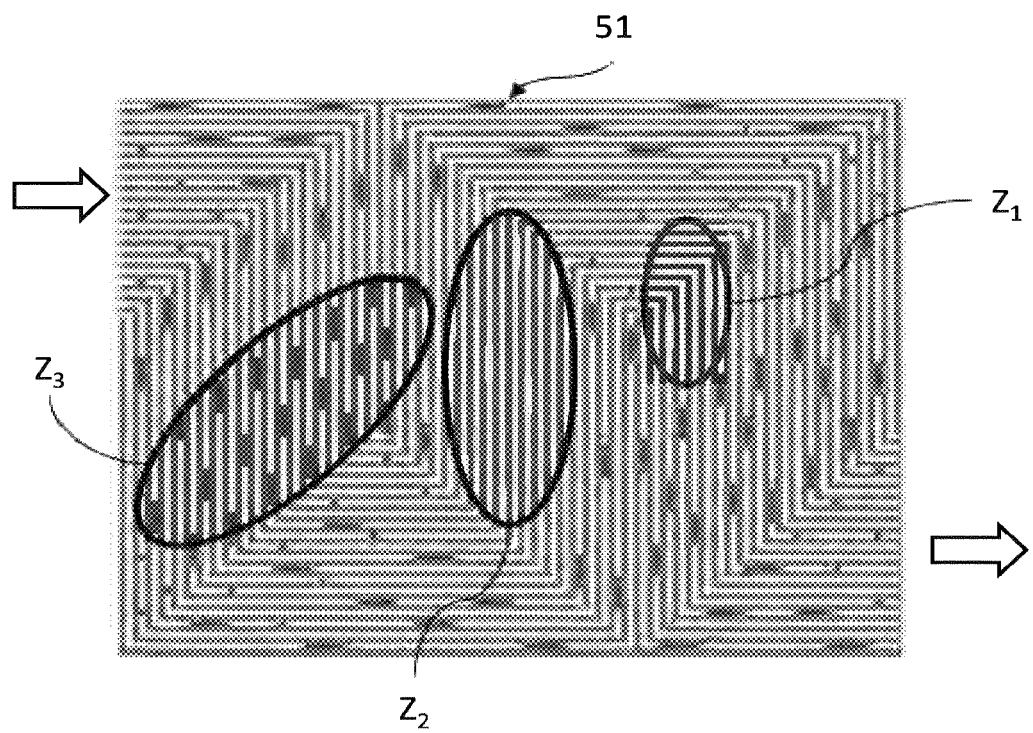
FIG. 6c is a schematic representation of a cooling circuit as seen from above, in which the locally shaded zones illustrate spot welds or the presence of a coating product.

As illustrated in FIG. 6c, the bipolar plate is produced while locally modifying the initial spatial distribution of the electrical resistance R of the cell by modifying the contact resistance $R_{BP}$ between the two sheets. In the figure, a cathodic air-distributing circuit 51 of a bipolar plate has been schematically shown from above, said circuit extending between an inlet and an outlet, the various rectangular shaded zones thereof representing zones in which the contact resistance $R_{BP}$ has been locally modified. In the zones $Z_1$ and $Z_2$ in which the local temperature corresponding to an initially uniform distribution of the electrical resistance is liable to be above the set-point temperature $T^c$, the density of the spot welds is decreased with respect to the initial density, so that the electrical resistance R is maximal and limits the local production of electrical power and therefore of thermal energy. In the zone $Z_3$ in which the local temperature is liable to be below the set-point temperature $T^c$, the density of the spot welds is increased with respect to the initial density, so that the electrical resistance R is minimal and allows a maximal local production of electrical power and therefore of thermal energy. Thus, the electrochemical cell equipped with a bipolar plate the contact resistance $R_{BP}$ of which has a distribution thus modified delivers in operation and at every point in the active zone an effective temperature substantially equal to the set-point temperature, the latter advantageously being uniform.

Equivalently, the locally shaded zones in FIG. 6c may illustrate the zones in which a coating having a high electrical conductivity has been deposited. Thus the contact resistance $R_{Bp}$ of the bipolar plate is modified in order to adjust the electrical resistance R of the cell so that at every point in the active zone the effective temperature of the cell is substantially identical to the set-point temperature.

As FIGS. 2 and 4 show, at the end of the step of producing the electrochemical cell so that the electrical resistance R has the spatial distribution $R_{x,y}^f$ determined beforehand, a step of measuring the spatial distribution of the effective temperature of the cell in operation is carried out, then the latter is compared to the set-point temperature $T^c$. Steps 110, 120; 210, 220 may be reiterated while modifying the properties of the new reference cell and/or while refining the spatial distribution of the set-point temperature, and especially while adjusting the coefficients $K^i$ and $K^\Phi$. The following steps of the method for determining the distribution of the electrical resistance R then the step of producing the bipolar plate are then carried out, then a new step of comparing the effective temperature of the cell in operation to the set-point temperature is carried out, until a convergence parameter indicates that this difference is smaller than a preset threshold value.

Particular embodiments have just been described. Various modifications and variants will be apparent to the person skilled in the art.

Thus, the parameter of interest representative of the production of electrical power of an electrochemical cell may more particularly be representative of the contact resistance $Rc_{BP/GDL}$ between the diffusion layer of the electrode and the adjacent bipolar plate.

The contact resistance $Rc_{GDL/PB}$ of the electrode with the bipolar plate may be adjusted depending on the spatial distribution $\Delta T_{x,y}^e$, $Q_{x,y}^e$ of a second thermal quantity $\Delta T^e$, $Q^e$ depending on whether the method according to the first embodiment (FIG. 2) or the second embodiment (FIG. 4) is used.

To do this, a method for producing an electrochemical cell includes a step in which the thickness of at least one of the bipolar plates is adjusted locally. More precisely, the thickness of the bipolar plate is decreased in a zone $Z_i$ in which the effective temperature is above the set-point temperature and proportionally to the local value of this difference. Thus, this decrease in the thickness of the bipolar plate leads to a decreased load on the diffusion layer, thereby increasing the contact resistance $Rc_{PB/GDL}$ and leading to a decrease in the local production of electrical power and therefore of thermal energy. Conversely, the thickness of the bipolar plate is increased in another zone $Z_i$ in which the effective temperature is below the set-point temperature and proportionally to the local value of this difference. Thus, this increase in the thickness of the bipolar plate leads to an increased load on the diffusion layer, thereby decreasing the contact resistance $Rc_{PB/GDL}$ and leading to an increase in the local production of electrical power and therefore of thermal energy. It will be noted that the variation in the thickness of the bipolar plate also causes the cross section of the channels for distributing the active species to vary, which also induces a variation in the production of electrical power and therefore thermal energy, which corresponds to the variation in contact resistance.

Alternatively or complementarily, at least one clamping plate is placed in contact or a distance away from the electrochemical cell, this clamping plate being structured so as to ensure that a clamping load is applied to the cell such as to create mechanical stresses that result in local variations in the contact resistance $Rc_{PB/GDL}$. It may be a question of one or two clamping plates placed on either side of a stack of electrochemical cells and/or a clamping plate, or insert, placed between two adjacent cells of the stack. The clamping plate has a variable thickness that leads to a variable load on the diffusion layer, thereby modifying the contact resistance $Rc_{PB/GDL}$ and causing the local production of electrical power and therefore of thermal energy to vary.

Thus, applying a nonuniform load to the electrochemical cell such as to create nonuniformities in the spatial distribution of the contact resistance $Rc_{PB/GDL}$ between the electrode and the bipolar plate amounts to correcting the temperature nonuniformities of the electrochemical cell so that the temperature corresponds to the set-point temperature.

As a variant or complementarily, the parameter of interest representative of the production of electrical power of an electrochemical cell may be the load of catalyst present in the active layer of at least one of the electrodes, the catalyst possibly for example being the platinum located in the active layer of the cathode. By load, or loading, what is meant is the weight per unit area.

Specifically, the local electrical current density $I_{x,y}$ is directly proportional to the local load $C_{x,y}$ of catalyst. Thus, the spatial distribution $C_{x,y}$ of the load of catalyst is determined depending on the spatial distribution $\Delta T_{x,y}^e$, $Q_{x,y}^e$ of the second thermal quantity $\Delta T^e$; $Q^e$ depending on whether the determining method according to the first embodiment (FIG. 2) or according to the second embodiment (FIG. 4) is applied.

A method for producing an electrochemical cell then includes a step of depositing the catalyst, for example using a catalytic ink, on the surface of the membrane or on the diffusion layer. This catalytic ink may especially be composed of the catalyst supported on carbon (platinum-coated carbon), of a solvent and of a protonically conductive polymer (ionomer), in general of the same nature as the electrolyte. The deposition may be carried out using printing methods such as coating, spraying, ink-jet printing, or screen printing. It is then possible to carry out a plurality of steps of localized deposition of various catalytic inks that differ from each other in the load of catalyst.

It is moreover advantageous to keep the total load of catalyst in the active zone the same so as not to modify the total electrical current density of the cell in operation.

Thus, the variations in the load of catalyst result in nonuniformities in the spatial distribution of current density and therefore in the produced heat flux, which compensate for nonuniformities in the temperature of the electrochemical cell so that the temperature corresponds to the set-point temperature.

As a variant or complementarily, the parameter of interest representative of the production of electrical power of an electrochemical cell may be representative more particularly of the fluidic permeability of at least one of the electrodes of the cell, and may for example be the permeability k of the diffusion layer of the anode or cathode. The permeability k describes the capacity of the layer to allow fluids to diffuse therethrough.

Specifically, the local electrical current density $I_{x,y}$ is directly proportional to the amount of reactive species having diffused through the diffusion layer as far as the active layer of the electrode. Thus, a diffusion layer having locally an almost zero permeability k does not allow the reactive species to reach the active layer, this resulting in a substantially zero local electrical current density. Thus, the spatial distribution of the permeability k of the diffusion layer is determined depending on the spatial distribution $\Delta T_{x,y}^e$, $Q_{x,y}^e$ of the second thermal quantity $\Delta T^e$; $Q^e$ depending on whether the determining method according to the first embodiment (FIG. 2) or according to the second embodiment (FIG. 4) is applied.

Next, an electrode of the electrochemical cell is produced while locally modifying the permeability k of the diffusion layer so as to form nonuniformities in the spatial distribution $k_{x,y}$ of the permeability k with a view to correcting the nonuniformities in the temperature of the cell with respect to a set-point temperature. By way of example, the permeability of the diffusion layer is decreased locally in zones in which the effective temperature of the cell is liable to be above the set-point temperature. Thus, the local quantity of reactive species able to diffuse as far as the active layer is decreased, thereby decreasing the local current density and therefore the local produced heat flux. Thus, the effective temperature of the cell corresponds locally to the set-point temperature.

To do this, the diffusion layer is for example impregnated with a sealant in the identified zones $Z_i$. The sealant may comprise, by way of example, $TiO_2$ or colloidal silica. The amount of sealant impregnated locally into the diffusion layer may thus modify the porosity thereof in order thus to obtain a local permeability $k_{Z_i}$ having the desired value.

Thus, the variations in the permeability of the diffusion layer of the electrode result in nonuniformities in the spatial distribution of current density and therefore in the produced heat flux, which compensate for the nonuniformities in the temperature of the electrochemical cell so that the temperature corresponds to the set-point temperature.

The invention claimed is:

1. A method for determining a spatial distribution ($R_{x,y}^f$) of a parameter of interest (R) representative of electrical power production of an electrochemical cell and representative of an electrical resistance of the electrochemical cell,
said electrochemical cell including two electrodes separated from one another by an electrolyte and placed between two bipolar plates, said electrochemical cell being configured to supply reactive species to the two electrodes and to remove heat produced by the electrochemical cell in operation,
wherein the two bipolar plates of said electrochemical cell are formed from two sheets that are bonded to each other, each sheet of the two sheets including embossments having an external face defining a circuit configured to distribute the reactive species, the embossments of the sheets together having internal faces, which are opposite the external faces, defining a cooling circuit including cooling channels in fluid communication with one another between an inlet and an outlet of the cooling circuit, configured to allow fluid passage from one cooling channel to another cooling channel of said cooling channels after entering at the inlet and before exiting at the outlet of the cooling circuit,
the method comprising:
i) providing the electrochemical cell, within which the parameter of interest (R) has an initial spatial distribution ($R_{x,y}^i$), and within which a spatial distribution of a temperature within the electrochemical cell in operation has at least one local temperature value greater thane or equal to a preset maximum local temperature value;
ii) defining a spatial distribution ($T_{x,y}^c$) of a set-point temperature ($T^c$) within the electrochemical cell in operation, said spatial distribution ($T_{x,y}^c$) being such that local temperature values are lower than preset maximum local temperature values;
iii) measuring a spatial distribution ($D_{x,y}^r$) of a first thermal quantity ($D^r$) representative of local removal of heat within said electrochemical cell in operation, the first the quantity ($D^r$) being a measured effective local flow rate of heat-transfer fluid flowing in a cooling circuit of a bipolar plate of the two bipolar plates of the electrochemical cell in operation, and the measured spatial distribution of the heat-transfer fluid flow rate having spatial inhomogeneities;
iv) estimating a spatial distribution ($Q_{x,y}^e$) of a second thermal quantity ($Q^e$) representative of local production of heat within said electrochemical cell in operation, the second thermal quantity ($Q^e$) being the local heat flux produced by said electrochemical cell in operation, the estimating depending on said defined spatial distribution ($T_{x,y}^c$) of the set-point temperature ($T^c$) within the electrochemical cell in operation rind on said measured spatial distribution ($D_{x,y}^r$) of the first thermal quantity ($D^r$), so that:
the first thermal quantity ($D^r$) of the electrochemical cell has said measured spatial distribution ($D_{x,y}^r$),
the second thermal quantity ($Q^e$) of the electrochemical cell has said estimated spatial distribution ($Q_{x,y}^e$), and
an effective spatial distribution of the temperature within said electrochemical cell in operation is then substantially equal to said defined spatial distribution ($T_{x,y}^c$) of the set-point temperature ($T^c$) within the electrochemical cell in operation; and
v) determining the spatial distribution ($R_{x,y}^f$) of the parameter of interest (R) depending on the estimated spatial distribution ($Q_{x,y}^e$) of the second thermal quantity ($Q^e$).

2. The method according to claim 1, wherein the parameter of interest (R) is chosen from a parameter representative of a contact resistance between at least one of the electrodes and an adjacent bipolar plate, a load of a catalyst present at least in one of the electrodes, and a parameter representative of a permeability of at least one of the electrodes.

3. The method according to claim 1, wherein the determining the spatial distribution ($R_{x,y}^f$) of the parameter of interest (R) further depends on a preset value of a parameter representative of an overall electrical power of the electrochemical cell.

4. The method according to claim 1, wherein estimating a spatial distribution of the second thermal quantity includes:
   generating a mesh of a cooling circuit of at least one bipolar plate of the two bipolar plates, the cooling circuit being configured to per flow of a heat-transfer fluid, and
   simulating, numerically by a computer, the second thermal quantity ($Q^e$) on said mesh, by solving a discrete numerical model expressing the second thermal quantity ($Q^e$) as a function of the at least one local temperature value and of the first thermal quantity ($D^r$).

5. The method according to claim 1, wherein the determining the spatial distribution ($R_{x,y}^f$) of the parameter of interest includes:
   a) estimating the spatial distribution ($I^e$) of the density of an electrical signal produced by the electrochemical cell in operation, from the estimated spatial distribution ($Q_{x,y}^e$) of the local heat flux; and
   b) determining the spatial distribution ($R_{x,y}^f$) of the parameter of interest (R), from a local density of the electrical signal.

6. A method for producing an electrochemical cell including two electrodes separated from each other by an electrolyte and placed between two bipolar plates, said electrochemical cell being configured to supply reactive species to the two electrodes and to remove heat produced by the electrochemical cell in operation, the method comprising:
   considering a reference electrochemical cell having a parameter of interest (R) representative of electrical power production of the electrochemical cell and distributed with an initial spatial distribution ($R_{x,y}^i$);
   determining a spatial distribution ($R_{x,y}^f$) of parameter of interest (R), using the method according to claim 1; and
   producing the electrochemical cell, on the basis of the reference electrochemical cell in which the parameter of interest (R) has the determined spatial distribution ($R_{x,y}^f$).

7. A method for producing an electrochemical-cell bipolar plate, comprising:
   i) considering a reference electrochemical cell including two electrodes separated from each other by an electrolyte and placed between two bipolar plates configured to supply reactive species to the electrodes and to remove heat produced by the electrochemical cell in operation, the cell having an electrical resistance that is spatially distributed with an initial spatial distribution ($R_{xy}^i$):
   ii) determining a spatial distribution ($R_{xy}^f$) of the electrical resistance, using the method according to claim 1; and
   iii) producing said electrochemical-cell bipolar plate such that the electrical resistance has the determined spatial distribution ($R_{xy}^f$).

8. The method for producing an electrochemical-cell bipolar plate according to claim 7, said electrochemical-cell bipolar plate being forme from two embossed sheets that are joined to each other by a plurality of spot welds distributed with an initial spatial distribution of spot welds, the producing the electrochemical-cell bipolar plate including modifying an initial spatial distribution of a parameter representative of a contact resistance between the two embossed sheets depending on the determined spatial distribution ($R_{x,y}^f$).

9. The method for producing an electrochemical-cell bipolar plate according to claim 8, wherein the modifying the initial spatial distribution of the parameter representative of the contact resistance includes modifying the initial spatial distribution of the spot welds joining the two embossed sheets to each other depending on said determined spatial distribution ($R_{x,y}^f$) of the electrical resistance.

10. The method for producing an electrochemical-cell bipolar plate according to claim 8, wherein the modifying the initial spatial distribution of the parameter representative of the contact resistance includes placing a coating having an electrical conductivity different from air electrical conductivity of the two embossed sheets in zones previously identified from said determined spatial distribution ($R_{x,y}^f$) of the electrical resistance.

11. The method for producing an electrochemical-cell bipolar plate according to claim 9, wherein the modifying the initial spatial distribution of the parameter representative of the contact resistance includes placing a coating having an electrical conductivity different from an electrical conductivity of the two embossed sheets in zones previously identified from said determined spatial distribution ($R_{x,y}^f$) of the electrical resistance.

12. A nontransitory data storage medium containing instructions, which when run on a processor, cause the processor to perform a method according to claim 1.

* * * * *

UNITED STATES PATENT AND TRADEMARK OFFICE
CERTIFICATE OF CORRECTION

PATENT NO.      : 10,686,202 B2
APPLICATION NO. : 15/271669
DATED           : June 16, 2020
INVENTOR(S)     : Fredy-Intelligent Nandjou Dongmeza et al.

Page 1 of 1

It is certified that error appears in the above-identified patent and that said Letters Patent is hereby corrected as shown below:

On the Title Page

In Column 1, item (72), Inventors, Line 7, delete "Turin" and insert -- Torino --, In Column 2, item (57), Abstract, Line 4, after "$(R_{x,y}{}^f)$" insert -- of --, In the Claims In Column 20, Line 7, Claim 1, after "opposite" insert -- to --, In Column 20, Line 20, Claim 1, delete "thane" and insert -- than --, In Column 20, Line 30, Claim 1, delete "the" and insert -- thermal --, In Column 20, Line 43, Claim 1, delete "rind" and insert -- and --, In Column 21, Line 9, Claim 4, delete "per" and insert -- permit --, In Column 21, Line 36, Claim 6, after "of" insert -- the -- (First Occurrence), In Column 22, Line 5, Claim 7, delete "$(R_{xy}{}^i)$:" and insert -- $(R_{x,y}{}^i)$: --, In Column 22, Line 6, Claim 7, delete "$(R_{xy}{}^f)$" and insert -- $(R_{x,y}{}^f)$ --, In Column 22, Line 10, Claim 7, delete "$(R_{xy}{}^f)$." and insert -- $(R_{x,y}{}^f)$. --, In Column 22, Line 13, Claim 8, delete "forme" and insert -- formed --, and;

In Column 22, Line 31, Claim 10, delete "air" and insert -- an --, therefor.

Signed and Sealed this
Twentieth Day of October, 2020

Andrei Iancu
*Director of the United States Patent and Trademark Office*